United States Patent [19]

Bolin

[11] Patent Number: 5,044,488

[45] Date of Patent: Sep. 3, 1991

[54] ARTICLE TRANSFER APPARATUS

[75] Inventor: James A. Bolin, Tulsa, Okla.

[73] Assignee: Liberty Glass Company, Sapulpa, Okla.

[21] Appl. No.: 447,662

[22] Filed: Dec. 8, 1989

[51] Int. Cl.⁵ .............................................. B65G 25/00
[52] U.S. Cl. ...................................... 198/430; 198/740
[58] Field of Search ................................ 198/430, 740

[56] References Cited

U.S. PATENT DOCUMENTS

| | | | |
|---|---|---|---|
| 3,960,266 | 6/1976 | Becker | 198/235 |
| 4,081,073 | 3/1978 | Zappia | 198/430 |
| 4,339,028 | 7/1982 | Meacle | 198/427 |
| 4,528,018 | 7/1985 | Schneider et al. | 65/260 |
| 4,660,711 | 4/1987 | Alonso et al. | 198/430 |

FOREIGN PATENT DOCUMENTS 2174667 11/1986 United Kingdom ................. 198/430

OTHER PUBLICATIONS

Title: Electronically Controlled Hydraulically Operate Stackers, author: Hellok-Automations-Systeme.

Primary Examiner—Joseph E. Valenza
Attorney, Agent, or Firm—Senniger, Powers, Leavitt & Roedel

[57] ABSTRACT

Apparatus for transferring articles such as glass containers from a first conveyor, on which the containers are travelling generally horizontally in line one after another, on to a second conveyor extending generally at right angles to the first conveyor from one side of the first conveyor. The apparatus is operable in cycles to transfer on each cycle a group of articles from the first to the second conveyor with the articles in the group extending in a row transversely of the second conveyor. The apparatus includes a support, a first carriage on the support movable generally parallel to the second conveyor, a second carriage on the first carriage movable with respect to the first carriage generally parallel to the first conveyor, and a third carriage on the second carriage movable vertically with respect to the first and second carriages. The third carriage carries a pusher bar. The carriages are driven by separate motors under the control of a programmable controller which operates the motors during each cycle of the machine to drive the carriages to cause the pusher bar to transfer a group of articles from the first conveyor on to the second conveyor.

4 Claims, 8 Drawing Sheets

ARTICLE TRANSFER APPARATUS

BACKGROUND OF THE INVENTION

This invention relates generally to apparatus for transferring articles from one location to another and, more particularly, to apparatus for transferring articles from a first conveyor, on which the articles are travelling generally horizontally in line one after another in a first direction, on to a second conveyor extending generally at right angles to the first conveyor, the apparatus being operable in cycles to transfer on each cycle a group of articles from the first to the second conveyor with the articles in the group extending in a row transversely of the second conveyor.

This invention has particular (albeit not exclusive) application to the glass container industry where apparatus referred to as a "stacker" is used to transfer molded glass containers travelling in line one after another on a first conveyor (sometimes referred to as the "cross conveyor") on to a second conveyor (sometimes referred to as the "lehr conveyor") for conveyance of the containers to a lehr or oven. This transfer takes place shortly after the molding step and while the glass containers are still very hot and thus easily damaged, so that any contact between containers, either as they are moved off the cross conveyor or after they are placed on the lehr conveyor, may damage the containers and render them unusable. It is important, therefore, that the containers be transferred in such a way that contact between the containers is avoided altogether or at least minimized. Prior stacker mechanisms have not accomplished this objective. Moreover, the movement of such prior mechanisms has been controlled by mechanical components such as cams. As a result, adjustment of the mechanism to accommodate variations in container size, conveyor speed, etc. has been time-consuming and caused excessive amounts of downtime of the entire container forming line. Other prior stackers have involved the use of hydraulic motors and have been limited in their range of motion, making adjustment to handle different situations difficult.

Reference may be made to U.S. Pat. Nos. 4,528,018, 4,339,028, 4,081,073 and 3,960,266 for transfer mechanisms generally in the field of this invention.

SUMMARY OF THE INVENTION

Among the several objects of this invention may be noted the provision of improved transfer apparatus of the "stacker" type useful in the glass container industry for transferring glass containers from the cross conveyor on to the lehr conveyor; the provision of such apparatus which is adapted for smoother transfer of articles off the cross conveyor and on to the lehr conveyor, thereby minimizing contact between the containers and increasing the number of undamaged containers delivered to the lehr; the provision of such apparatus which is quickly and readily adjustable to accommodate variations in container size, shape, spacing and speed; and the provision of such apparatus which is fast and reliable in operation.

In general, apparatus of this invention is used for transferring articles such as glass containers from a first conveyor, on which the containers are travelling generally horizontally in line one after another in a first direction on a first horizontal axis, on to a second conveyor extending in a second direction on a second horizontal axis generally at right angles to the first axis from one side of the first conveyor. The apparatus is operable in cycles to transfer on each cycle a group of articles from the first to the second conveyor with the articles in the group extending in a row transversely of the second conveyor. The apparatus comprises a support positionable at the side of the first conveyor opposite the second conveyor, and first, second and third carriages. The first carriage is mounted on the support for reciprocation relative to the support on or generally parallel to said second axis between a retracted position away from the first conveyor and an advanced position toward the first conveyor. The second carriage is mounted on the first carriage for reciprocation with the first carriage on or generally parallel to said second axis and for reciprocation relative to the first carriage on or generally parallel to said first axis between a trailing position and a leading position relative to the line of articles on the first conveyor. The third carriage is mounted for reciprocation with the second carriage and therefore with the first carriage on or generally parallel to said second axis and for vertical reciprocation relative to the second carriage. Pusher means is carried by the third carriage for pushing a group of articles off the first conveyor on to the second conveyor. The third carriage is vertically reciprocable relative to the second carriage between a lowered position wherein the pusher means is at such an elevation relative to the first conveyor as to be engageable with a group of articles on the first conveyor on movement of the third carriage with the second and first carriages from the retracted position of the first carriage to its advanced position, and a raised position at an elevation above the top of the articles on the first conveyor. First drive means associated with the support is provided for driving the first carriage between its retracted and advanced positions; second drive means associated with the first carriage is provided for driving the second carriage between its said trailing and leading positions; and third drive means associated with the second carriage is provided for driving the third carriage up and down between its lowered and raised positions. Also provided is means for operating the first, second and third drive means for driving the first carriage from its retracted to its advanced position, and simultaneously driving the second carriage, with the pusher means down, from its trailing to its leading position for pushing said group of articles off the first conveyor and on to the second conveyor. The pusher means is mounted on the third carriage in such manner as to allow for passage of articles on the first conveyor behind the pusher means when it completes the transfer of said group on to the second conveyor. The operating means then acts in conjunction with the first, second and third drive means to raise the third carriage for raising the pusher means to its raised position to clear articles advancing on the first conveyor, and then to drive the second carriage back to its trailing position and the first carriage back to its retracted position, and, after the pusher means has moved back out over articles advancing on the first conveyor, to lower the pusher means, thereby positioning the latter for the start of the next cycle of operation.

Other objects and features will be in part apparent and in part pointed out hereinafter.

BRIEF DESCRIPTION OF THE DRAWINGS

Corresponding numerals indicate corresponding parts throughout the several views of the drawings.

DETAILED DESCRIPTION OF THE PREFERRED EMBODIMENT

Figure 1:
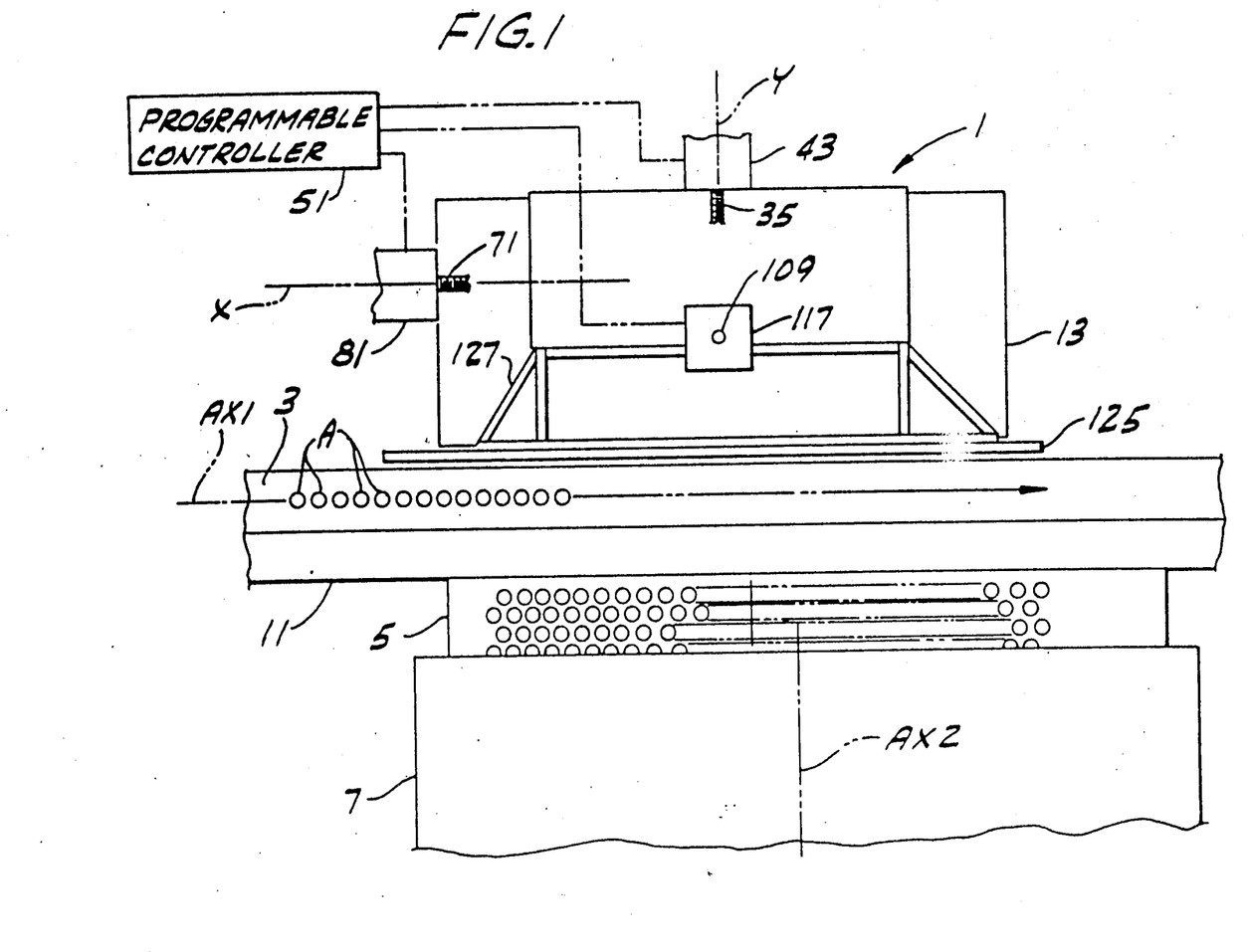
FIG. 1 is a schematic plan view of a stacker of the present invention for transferring containers (e.g., glass bottles) from a cross conveyor on to a lehr conveyor for conveyance to a lehr.

Referring now to the drawings, and first to FIG. 1, there is generally indicated at 1 apparatus (referred to in the glass container industry as a "stacker") for transferring articles A such as glass containers (e.g., glass bottles) from a first conveyor 3, sometimes referred to as a cross-conveyor, on to a second conveyor 5 for conveyance to a lehr or oven 7, for example. As shown, the articles on the cross conveyor are travelling from right to left generally horizontally in line one after another on a first axis AX1. In the case of glass bottles, the bottles on the cross-conveyor are usually fresh from the mold and still hot and thus readily deformable. The lehr conveyor 7 extends in a second direction on a second horizontal axis AX2 generally at right angles to the first axis AX1 from one side of the cross conveyor 3, a so-called deadplate 11 being interposed between the cross conveyor and the inlet end of the lehr conveyor. As will be discussed in detail hereinbelow, the apparatus of this invention is operable in cycles to transfer on each cycle a group of articles (e.g., 20 articles) from the cross conveyor to the lehr conveyor with the articles in the group extending in a row transversely of the lehr conveyor. Moreover, the apparatus is operable to effect this transfer with little or no contact between the articles, which is very important where hot glass containers are involved to minimize the number of damaged and unuseable containers which enter the lehr. It will be understood that while the apparatus of this invention is described herein as a stacker having special application to the glass container industry, the apparatus may have other applications in other industries for transferring various types of articles from one conveyor to another in the manner described.

Figure 2:
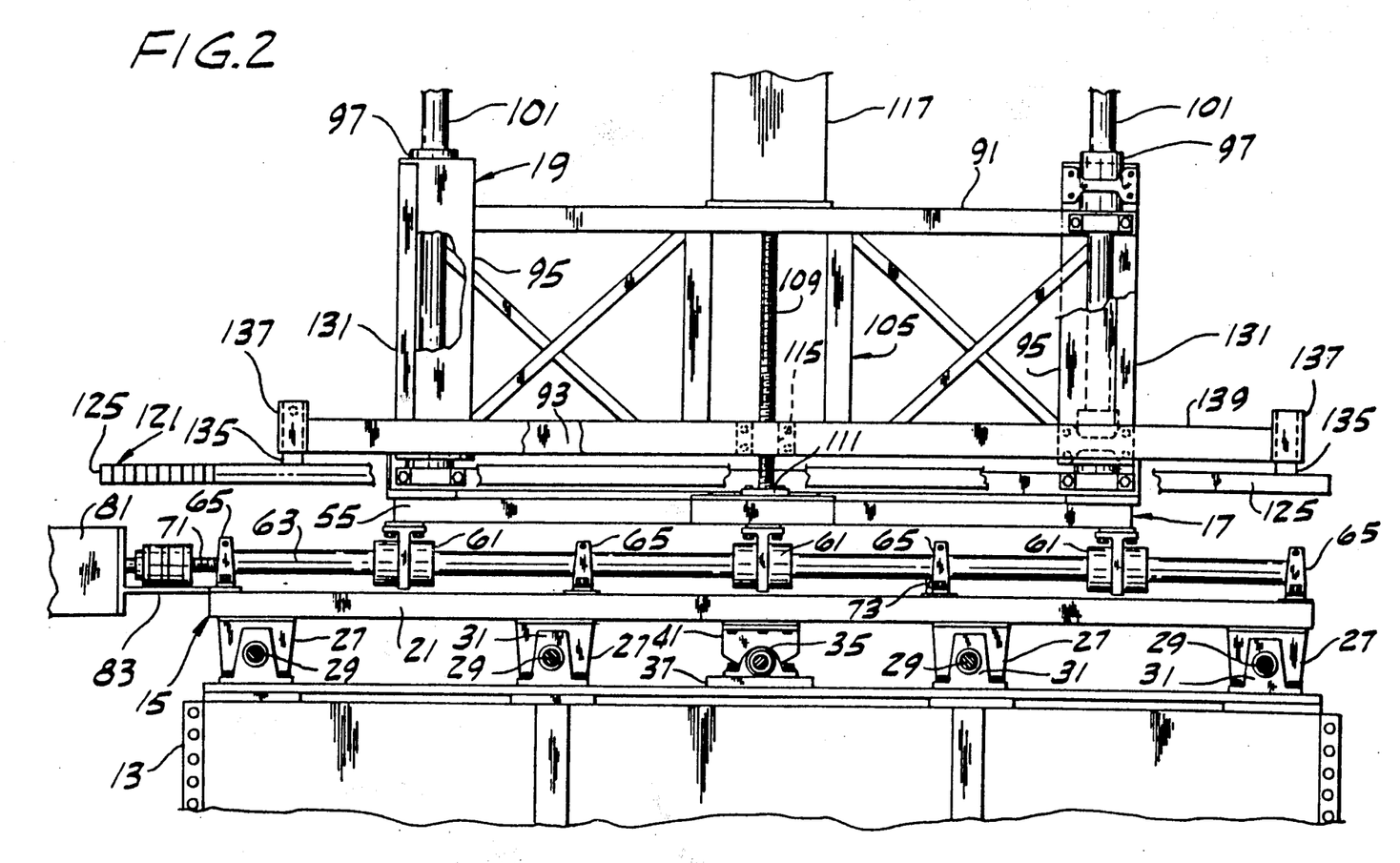
FIG. 2 is a front elevation of the stacker with parts broken away to show details.
Figure 3:
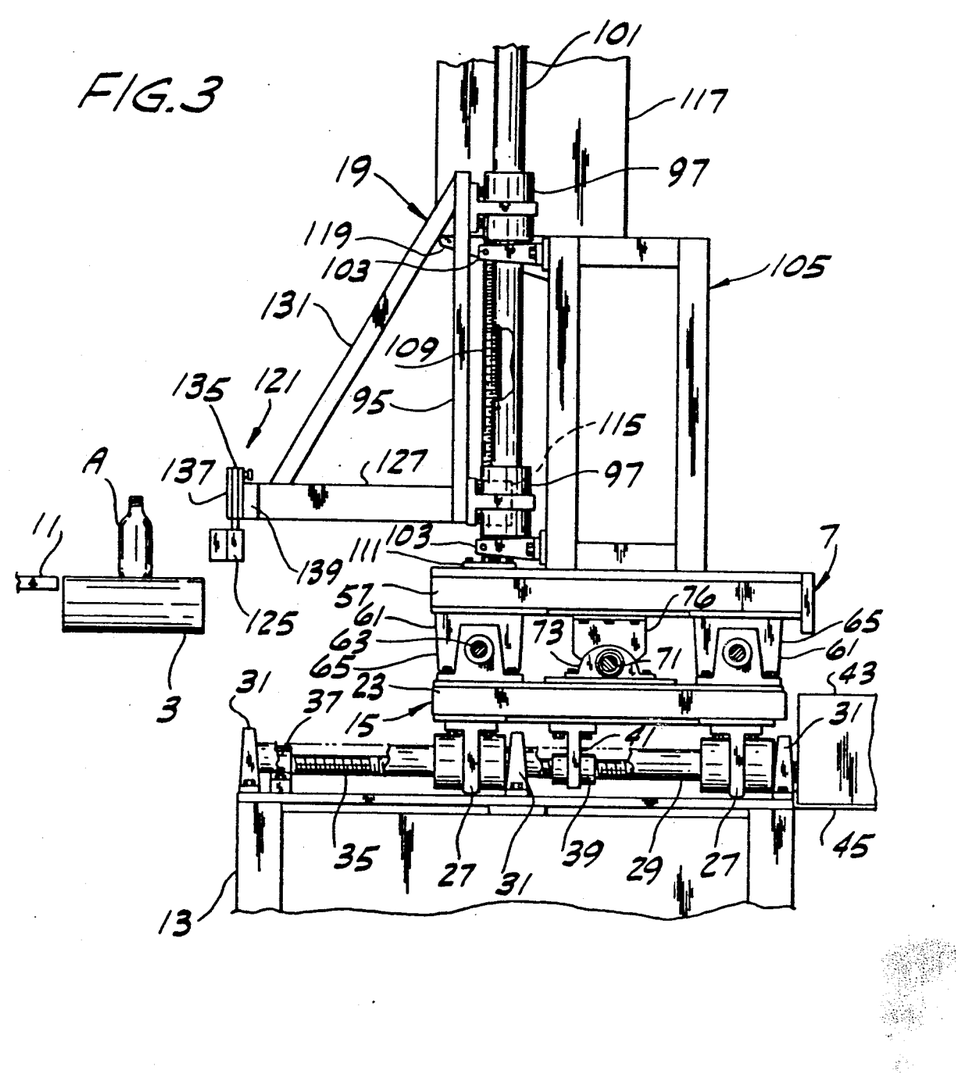
FIG. 3 is a side elevation of the stacker with parts broken away to show details.
Figure 4:
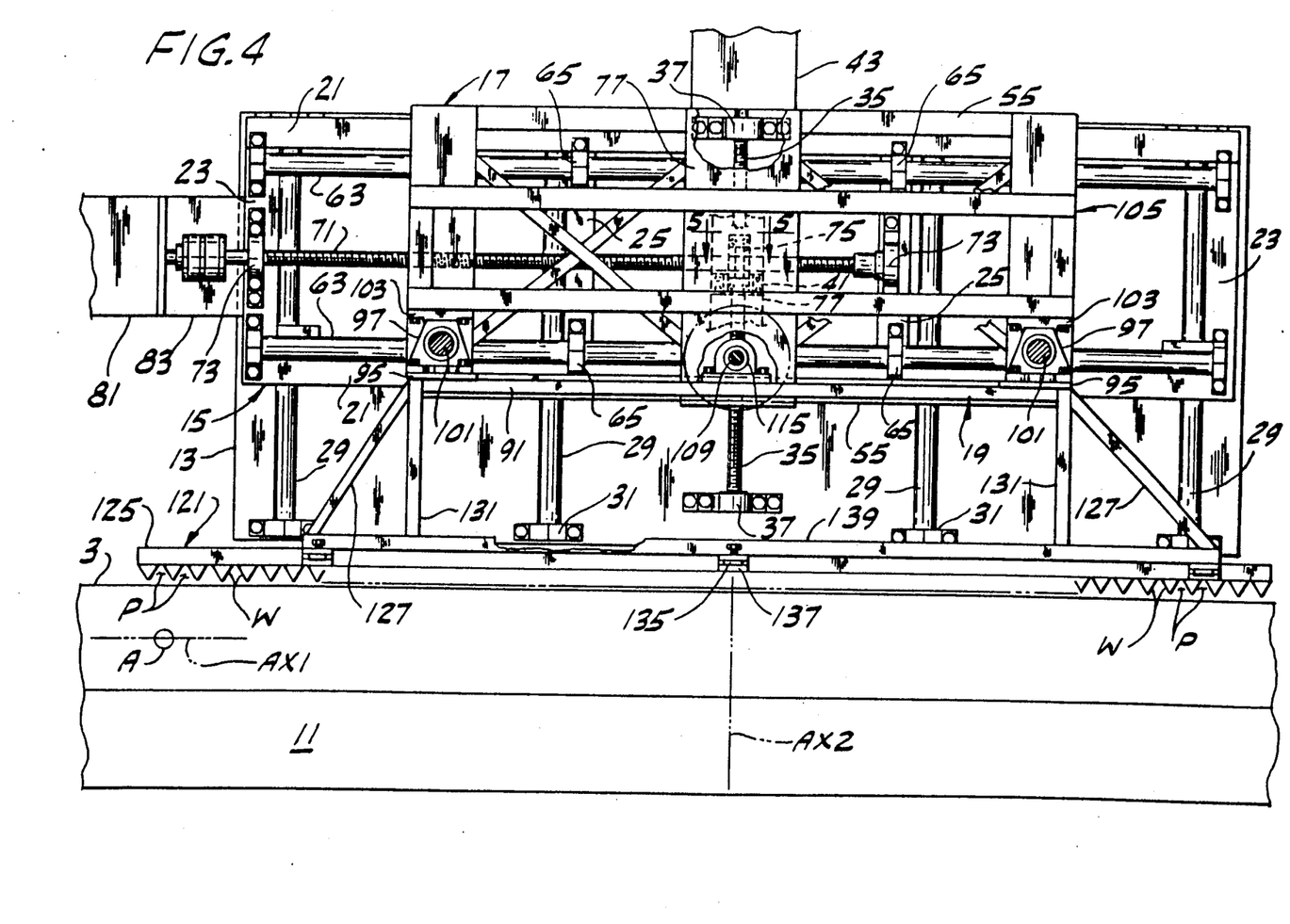
FIG. 4 is a plan view of the stacker with parts broken away to show details.
Figure 5:
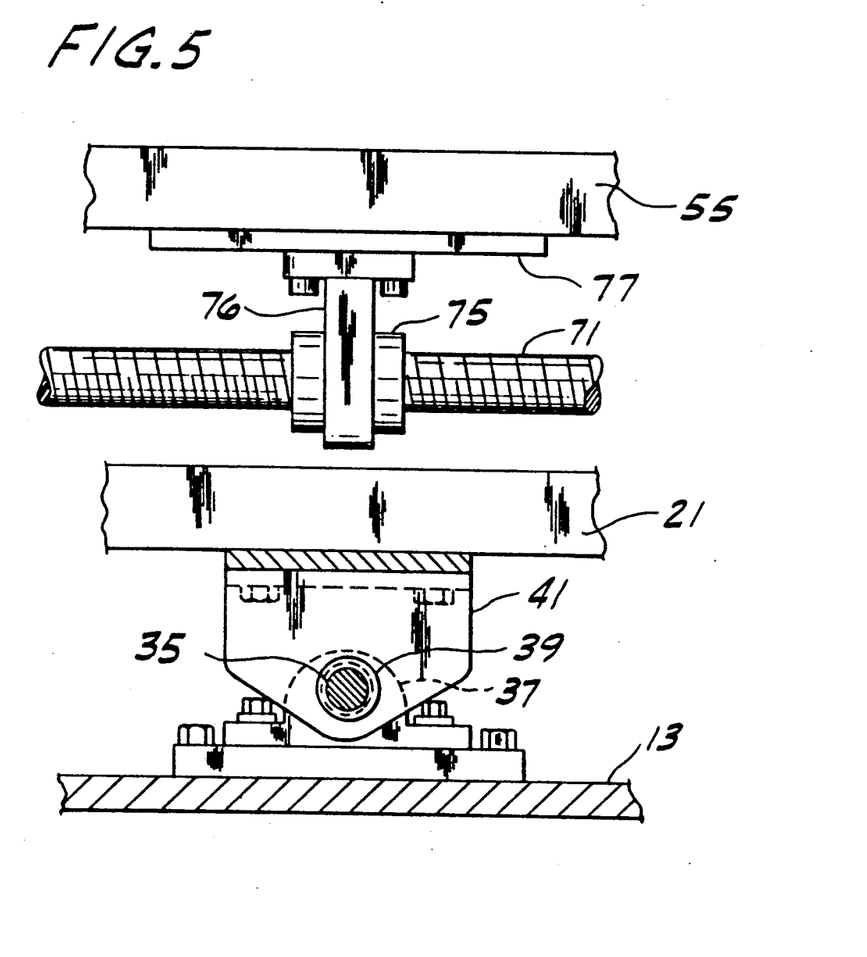
FIG. 5 is an enlarged vertical section taken on 5—5 of FIG. 4.
Figure 7A:
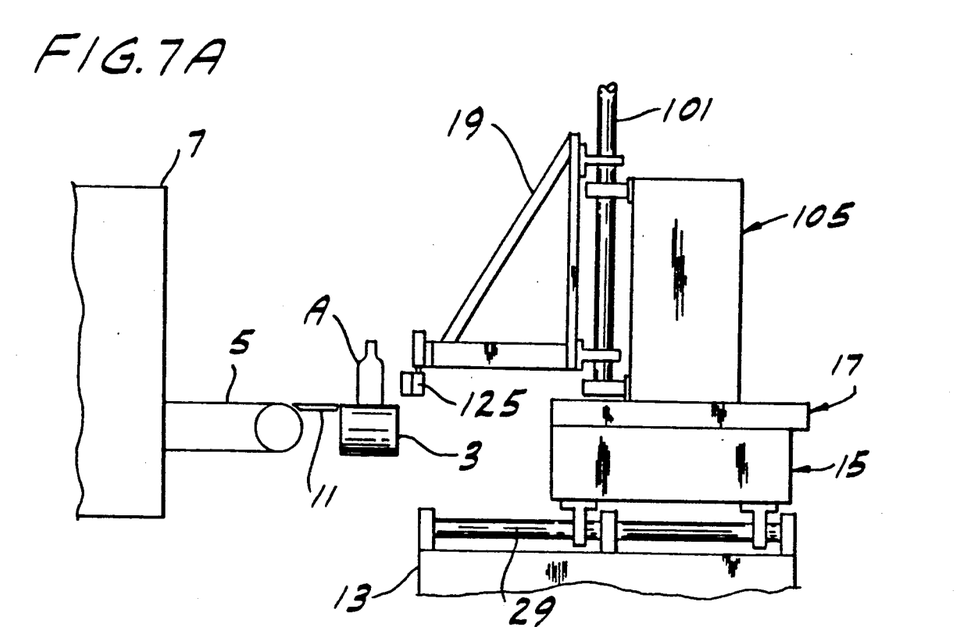
FIGS. 7A-7E are schematic views illustrating the position of the pusher bar relative to bottles on the cross conveyor at various times during a typical cycle of operation.

Referring now to FIGS. 2-4, the stacker apparatus of this invention comprises a support or base 13 in the form of a table or other suitable framework positioned at the side of the cross conveyor 3 opposite the lehr conveyor 5, and first, second, and third carriages generally designated at 15, 17 and 19, respectively, mounted on the support 13. The first carriage 15 includes a pair of horizontal spaced-apart frame members or rails, each designated 21, extending longitudinally of the carriage generally parallel to axis AX1, a pair of side frame members or rails, each designated 23, connecting the longitudinal rails at opposite sides of the carriage, and a pair of support plates, each designated 25, spanning the longitudinal rails between the side rails. Slide members 27 are affixed to the underside of the carriage and are slidable on a plurality of spaced apart horizontal guide rods 29 (e.g., four rods are shown) rigidly mounted on the table and extending generally parallel to AX2. Each guide rod 29 is supported at its ends and middle by suitable supports indicated at 31 (FIG. 3). Together the slide members 27 and guide rods 29 function as means for mounting the first carriage 15 for reciprocation relative to the table 13 on or generally parallel to axis AX2 between a retracted position (FIG. 7A) away from the cross conveyor 3 and an advanced position (FIG. 7C) toward the cross conveyor. This reciprocation is effected by means of a motor driven ball screw shaft 35 extending generally parallel to axis AX2 and having its ends journalled in bearing blocks 37 mounted on the table 13. The screw shaft 35 is rotatable in a nut 39 secured by means of a bracket 41 in fixed position to the underside of the first carriage 15 (FIG. 3), the arrangement being such that rotation of the screw shaft in one direction causes the carriage 15 to move in one direction relative to the shaft and rotation of the screw shaft in the reverse direction causes the carriage to move in the opposite direction. The screw shaft 35 is rotated by first drive means comprising an electric servo motor 43 (e.g., a stepping motor) mounted on a bracket 45 fastened to the table 13. The motor is under the control of a programmable controller 51, so that rotation of the screw shaft is precisely controlled for effecting precise movement of the carriage along or parallel to axis AX2.

The second carriage 17 includes a pair of horizontal spaced-apart frame members or rails, each designated 55, extending longitudinally of the carriage generally parallel to AX1, and a pair of end frame members or rails, each designated 57, connecting the longitudinal members at opposite ends of the carriage. Slide members 61 are affixed to the underside of the second carriage 17 and are slidable on a plurality of spaced apart horizontal guide rods 63 (two guide rods are shown) extending generally parallel to AX1. The guide rods are supported at spaced intervals along their lengths by suitable supports, each designated 65, affixed to the first carriage (FIG. 2). Together these slide members 61 and guide rods 63 function as means for mounting the second carriage 17 for reciprocation with the first carriage 15 on or generally parallel to the second axis AX2 and for reciprocation relative to the first carriage on or generally parallel to axis AX1 between a trailing position and a leading position relative to the line of articles on the cross conveyor 3. This latter reciprocation of the second carriage 17 relative to the first carriage 15 is effected by means of a ball screw shaft 71 extending generally parallel to axis AX1 and having its ends journalled in bearing blocks 73 mounted on the first carriage. The shaft is rotatable in a nut 75 secured by means of a bracket 76 in fixed position to the underside of a plate 77 spanning the longitudinal rails 55 of the second carriage, the arrangement being such that rotation of the screw shaft 71 in one direction causes the second carriage 17 to move in one direction relative to the shaft and rotation of the screw shaft in the opposite direction causes the carriage to move in the reverse direction. The screw shaft is rotated by second drive means comprising an electric servo motor 81 mounted on a bracket 83 fastened to second carriage 17. The motor 81 is similar to the motor 43 previously described and is under the control of the aforementioned programmable controller 51, rotation of the screw shaft 71 thus being precisely controlled for effecting precise movement of the carriage along or parallel to axis AX1.

The third carriage 19 includes upper and lower generally horizontal rails, designated 91 and 93, respectively (FIG. 2), interconnected by a pair of vertical frame members 95 at the sides of the carriage, which lies in a vertical plane generally parallel to AX1. A pair of slide members 97 are affixed to each vertical frame member 95 (FIG. 3) and are slidable on a plurality of spaced apart vertical guide rods 101 (e.g., two guide rods) mounted on the second carriage 17. The guide rods 101 are supported at spaced intervals along their lengths by suitable supports, each designated 103, affixed to a framework, generally indicated at 105, rigidly fastened to the second carriage 17. The slide members 97 and guide rods 101 (and associated framework 105) function as means for mounting the third carriage 19 for reciprocation with the second carriage 17 and therefore with the first carriage 15 on or generally parallel to the second axis AX2 and for vertical reciprocation relative to the second carriage. This vertical reciprocation of the third carriage relative to the second carriage is effected by means of a motor driven ball screw shaft 109 extending generally vertically and having its lower end journalled in a bearing 111 mounted on the second carriage and its upper end journalled in a bearing (not shown) mounted on the framework 105 supporting the guide rods 101. The screw shaft 109 is rotatable in a nut 115 secured in fixed position to the lower horizontal rail 93 of the third carriage 19, the arrangement being such that rotation of the screw shaft in one direction causes the third carriage to move up and rotation of the screw shaft in the reverse direction causes the carriage to move down. The screw shaft 109 is rotated by means of an electric servo motor 117 mounted on a bracket 119 fastened to framework 105 for the vertical guide rods. The motor 117 is similar to the motors previously described and is under the control of the aforementioned programmable controller 51, rotation of the screw shaft 109 thus being precisely controlled for effecting precise vertical movement of the carriage.

Indicated generally at 121 is pusher means carried by the third carriage for pushing a group of articles off the cross conveyor on to the lehr conveyor. More specifically, pusher means 121 comprises a horizontal pusher bar 125 carried by a pair of horizontal arms 127 extending obliquely from the lower horizontal rail 93 of the third carriage (see FIG. 4). Suitable bracing 131 extends between the upper rail 91 and the outer ends of the arms 127 to provide the necessary strength. The pusher bar 125 extends generally parallel to the cross conveyor 3 (i.e., generally parallel to axis AX1) and has means thereon forming a series of pockets P (FIG. 4) spaced at intervals along the bar, each pocket being adapted to receive one article, and with the spacing between the pockets being selected according to the desired spacing between the articles when they are transferred on to the lehr conveyor. Each pocket P is defined (at least in part) by opposing diverging side walls, each designated W, which form a relatively wide mouth to facilitate entry of a respective article into the pocket. The diverging walls also function as means for guiding the article to a precise position in the pocket (a fully seated position). The V-shape of the pockets also serves to accommodate variances in spacing between the articles on the cross conveyor. The precise size, shape and spacing of the pockets P will depend on the size, shape and spacing of the articles being transferred.

The pusher bar is held in position by means of slide bars 135 slidable vertically in holders 137 attached to a horizontal beam 139 carried by the arms 127 on the third carriage. The slide bars 135 are releasably secured in position by set screws or other suitable means, the elevation of the pusher bar 125 thus being adjustable according to the height of the article being transferred. This arrangement also permits one pusher bar to be removed from the third carriage 19 and replaced by a different pusher bar configured to handle different articles, or article spacing, etc.

It will be noted that the trailing end portion of the pusher bar (the left end portion as viewed in FIG. 4) extends endwise a substantial distance beyond the trailing end of beam 139. The reason for this is to permit incoming articles A on the cross conveyor 3 to pass behind the pusher bar 125 without interference from the pusher bar framework when the pusher bar is transferring a leading group of articles on to the lehr conveyor 5, as will become apparent.

As the third carriage 19 reciprocates vertically, the pusher bar 125 is movable with the third carriage between a lowered position (FIG. 7A) wherein the pusher bar is at such an elevation relative to the cross conveyor 3 as to be engageable with the leading group of articles on the cross conveyor on movement of the third carriage with the second and first carriages from the retracted position of the first carriage 15 to its advanced position, and a raised position (FIG. 7D) at an elevation above the top of the articles on the cross conveyor.

As noted, operation of the servo motors 43, 81, 117 for driving the carriages 15, 17 and 19, respectively, is under the control of the controller 51, which is programmable for operating the motors to drive the carriages in such a manner as to effect the transfer of a group of articles from the cross conveyor on to the lehr conveyor. Generally, the controller operates motors 43 and 81 for driving the first carriage 15 from its retracted position to its advanced position, and for simultaneously driving the second carriage 17, with the pusher bar 125 down, from its trailing position to its leading position for pushing a leading group of articles off the cross conveyor. As noted above, the pusher bar is mounted in such a manner as to allow for passage of incoming articles on the cross conveyor behind the pusher bar when it completes the transfer of the group of articles on to the lehr conveyor. After the transfer has been completed, the controller acts to operate the motors 43, 81, 117 to raise the third carriage 19 for raising the pusher bar 125 to its raised position to clear the articles advancing on the cross conveyor 3, and then to drive the second carriage 17 back to its trailing position and the first carriage 15 back to its retracted position, and, after the pusher bar has moved back out over the articles advancing on the cross conveyor, to lower the pusher bar, thereby positioning the pusher bar for the start of the next cycle of operation.

Figure 6:
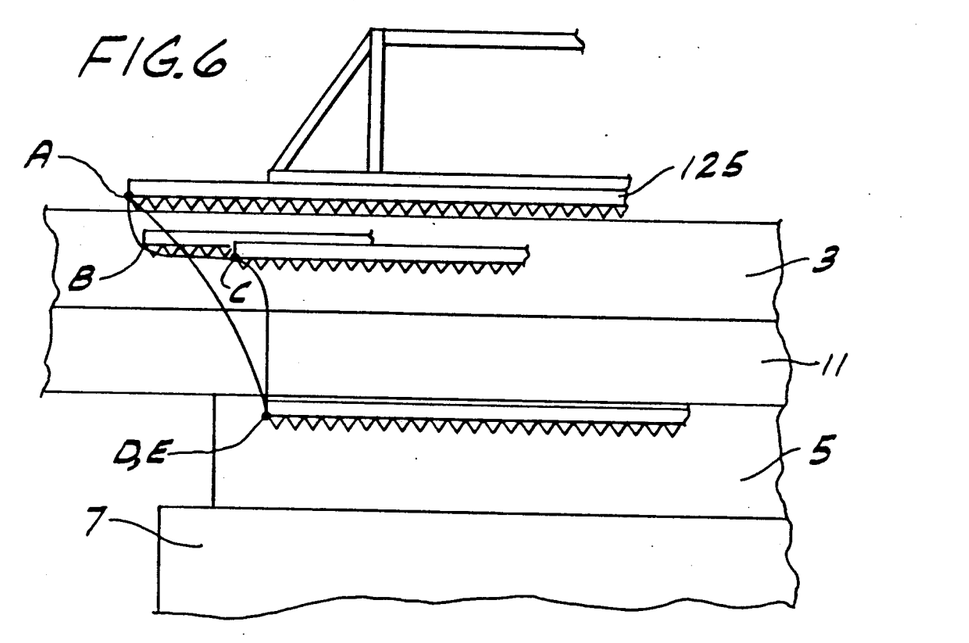
FIG. 6 is a schematic illustrating the movement of a pusher bar of the stacker in a typical cycle of operation.
Figure 7B:
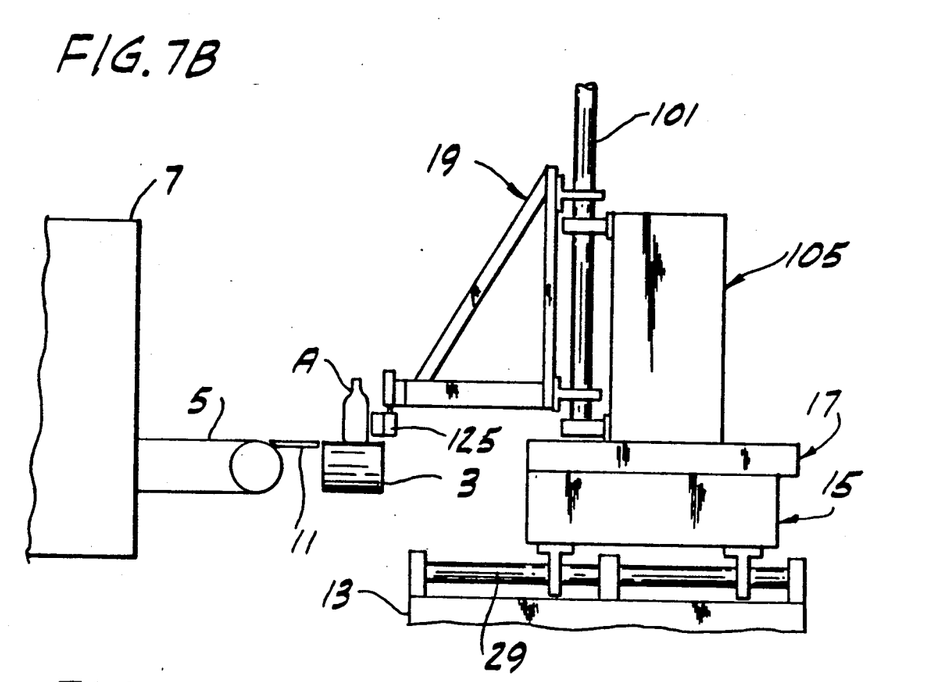
Figure 7C:
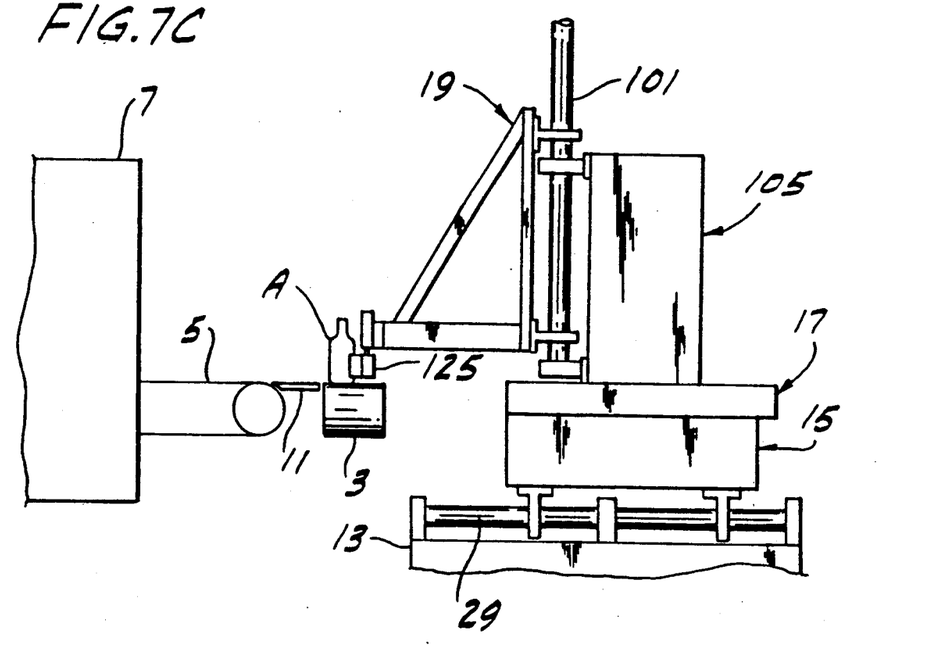
Figure 7D:
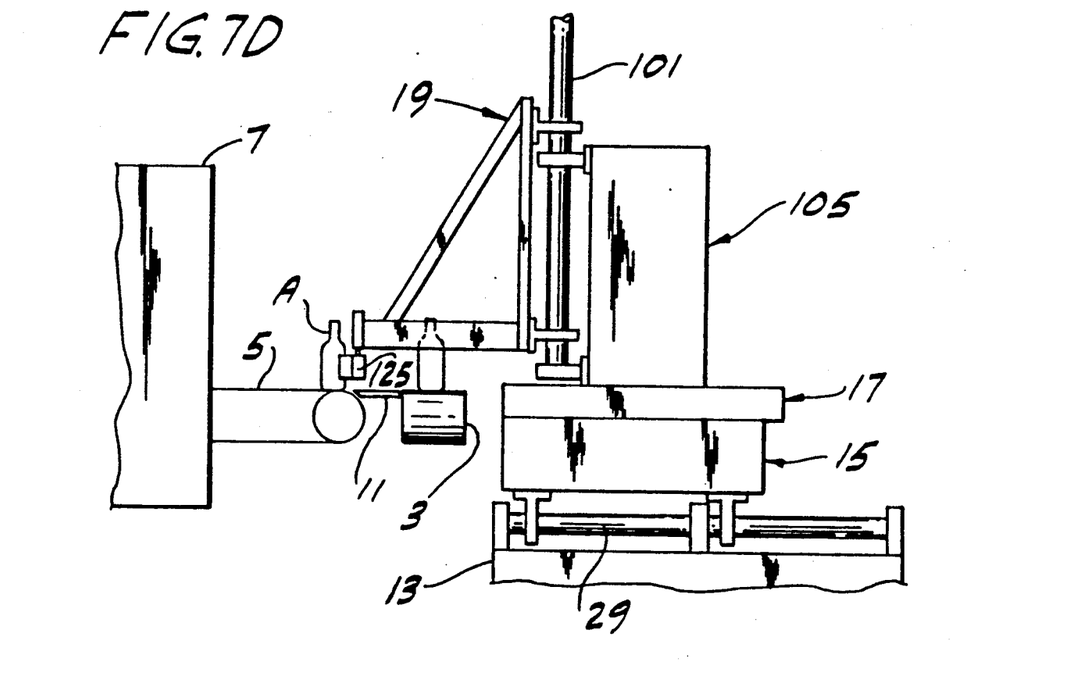
Figure 7E:
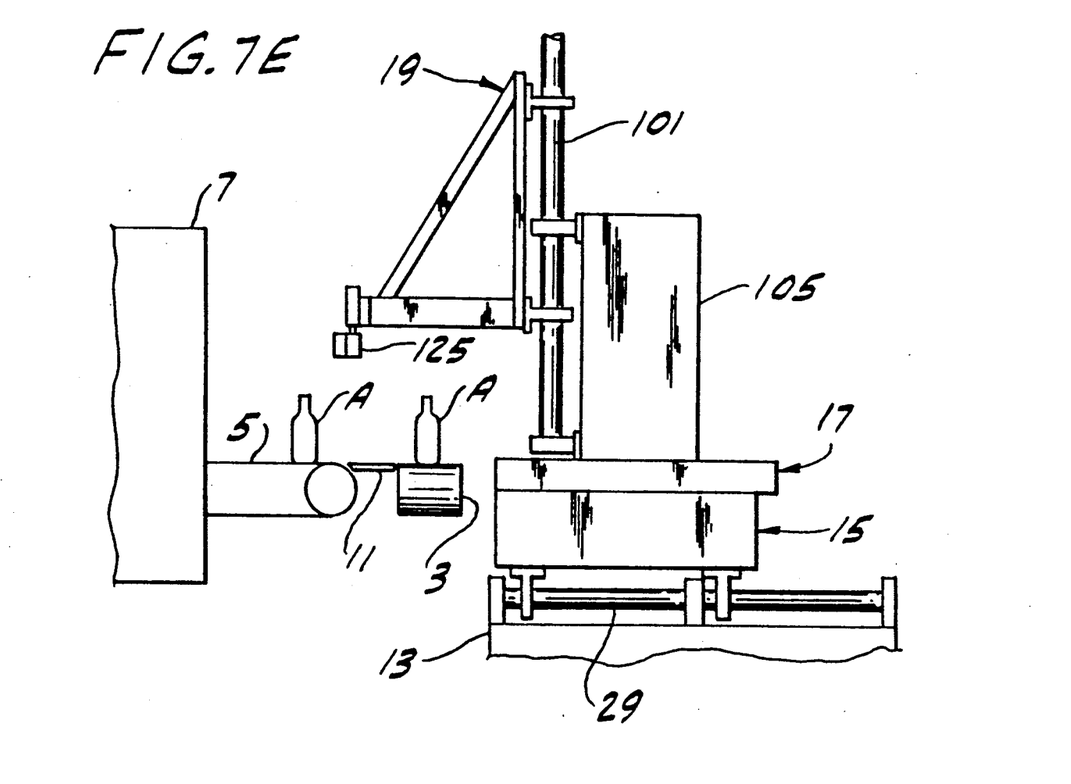

A cycle of operation of the apparatus may best be described with reference to FIGS. 6 and 7A–7E. FIG. 6 shows the path (as viewed from above the stacker) traced by a point on the pusher bar 125 during a typical cycle of machine operation, although it will be understood that the controller 51 may be programmed to vary this path according to the size and shape of the articles being transferred, the speed and width of the first conveyor, the width of the deadplate, the configuration of the rows of articles transferred to the lehr conveyor, and other factors. At the start of a cycle, the pusher bar 125 is in position "A" (FIG. 7A), the first carriage 15 is in its retracted position, the second carriage 17 is in its trailing position, and the third carriage 19 is in its lowered position. The controller 51 then operates motor 43 to drive the first carriage toward its advanced position on or generally parallel to axis AX2. Before the pusher bar reaches its advanced position, and before it engages articles on the cross conveyor 3 (position "B"; FIG. 7B), the controller simultaneously operates motor 81 to drive the second carriage on or generally parallel to axis AX1 to move the pusher bar 125 from its trailing position to its leading position in which the pockets P of the pusher bar are generally aligned with the leading group of articles on the cross conveyor 3. After this general alignment has been attained, the first carriage 15 continues to move toward its advanced position, which causes the pusher bar 125 to move into contact with the leading group of articles to be transferred (position "C"; FIG. 7C), and then to push the articles, with one article in each pocket on the pusher bar, off the cross conveyor 3, over the deadplate 11 and on to the lehr conveyor 5 with the articles in the group extending in a row transversely across the lehr conveyor for conveyance of the lehr conveyor (position "D"; FIG. 7D). As the articles move toward the lehr conveyor, the friction between the bottom of each article and the deadplate will cause the article to move further into its respective pocket P, with the diverging (or converging, depending on the perspective taken) side walls W guiding the article to a fully seated position in which the article is precisely positioned with respect to the other articles being transferred. This ensures that the articles, as delivered to the lehr conveyor, are properly positioned for maximum efficiency and minimum contact between the articles. As the transfer is being completed, incoming articles on the cross conveyor 3 pass behind the trailing end portion of the pusher bar 125. After the transfer has been completed, and before the leading article on the cross conveyor has advanced to a position in which it would strike the supporting framework for the pusher bar, the controller operates the motors 43, 81, 117 to drive the third carriage 19 to raise the pusher bar to an elevation in which it is able to clear the articles advancing on the cross conveyor ("E"; FIG. 7E), and then to drive the second carriage 17 back to its trailing position and the first carriage 15 back to its retracted position. After the pusher bar 125 has moved back over the next group of articles advancing on the cross conveyor, the controller operates motor 117 to lower the third carriage 19 and the pusher bar back to position "A". The stacker is then in position to repeat another cycle for transfer of the next group of articles (now leading) on the cross conveyor on to the lehr conveyor.

To effect a smooth transfer, it is desirable that the speed of the pusher bar 125 along axis AX1 precisely match the speed of the articles travelling on the cross conveyor 3 before the pusher bar makes contact with the leading group of articles. Immediately after the pusher bar has engaged the articles, it is preferred (albeit not essential) that the pusher bar accelerate relative to axis AX1 to separate the leading group of articles (now in the pockets P of the pusher bar) from the trailing articles advancing on the cross conveyor. The purpose of achieving this separation is to avoid possible collision between the pusher bar (and/or beam 139) and the incoming articles advancing on the cross conveyor as the pusher bar pushes the leading group of articles off the cross conveyor. The separation also permits the leading articles being transferred to be pushed on to the lehr conveyor at a velocity less than what would be required if there were no separation. Pushing the articles at lower speeds is advantageous in that this provides for a smoother transfer with less risk of articles tipping over as they move on to the lehr conveyor, thereby minimizing the number of damaged articles conveyed to the lehr. It is, of course, necessary that the stroke of the second carriage be sufficiently long to allow for the slower transfer speed on or generally parallel to axis AX2.

It will be apparent from the foregoing that the transfer apparatus of the present invention can handle a wide range of article sizes, shapes and spacing, cross conveyor speeds and widths, deadplate widths, etc., simply by suitably programming the controller to effect the appropriate movement of the carriages and/or by using a pusher bar with the appropriate pocket size, shape and spacing. Because the movement of the carriages is precisely controlled in terms of both speed and position by the servo motors and ball screw shafts, the transfer of the articles is effected smoothly and efficiently. Adjusting the apparatus to accommodate different situations is also accomplished in less time and with less effort than prior machines (utilizing cams, for example), thereby minimizing the downtime of the stacker for greater line production. For purposes of illustration only, the first carriage 15 may have a maximum stroke of 24 inches, for example, the second carriage 17 a stroke of 36 inches, for example, and The controller may be programmed to vary the length of the strokes depending on the situation. For example, the stroke of the second carriage 17 may vary between alternate cycles of machine operation to stagger the articles in one row of articles transferred on to the lehr conveyor relative to the articles in the row previously transferred on to the conveyor.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. Apparatus for transferring articles such as glass containers from a first conveyor, on which the containers are travelling generally horizontally in line one after another in a first direction on a first horizontal axis, on to a second conveyor extending in a second direction on a second horizontal axis generally at right angles to the first axis from one side of the first conveyor, said apparatus being operable in cycles to transducer on each cycle a group of articles from the first to the second conveyor with the articles in the group extending in a row transversely of the second conveyor, said apparatus comprising:

a base positionable at the other side of the first conveyor from the second conveyor, a first carriage mounted on the base for linear horizontal sliding movement at right angles to said first axis between a retracted position spaced away from the first conveyor and an advanced position past the first conveyor, means for effecting linear horizontal reciprocation of said first carriage back and forth between its retracted and advanced positions comprising a screw shaft mounted on the base extending horizontally at right angles to said first axis, a nut fixed to the bottom of said first carriage, the screw shaft extending through the nut in threaded interengagement therewith, and an electric motor mounted on the base for driving the screw shaft, a second carriage mounted on the first carriage for reciprocation with the first carriage and for linear horizontal sliding movement on the first carriage parallel to said first axis between a rearward retracted position and a forward advanced position relative to said first conveyor and said first carriage, means for effecting linear horizontal reciprocation of said second carriage relative to said first carriage back and fourth between its said rearward and forward positions comprising a second screw shaft mounted on the first carriage extending horizontally parallel to said first axis, a second nut fixed to the bottom of said second carriage, said second screw shaft extending through said second nut in threaded interengagement therewith, and a second electric motor mounted on said first carriage for driving said second screw shaft, said second carriage carrying a pair of slide guides extending vertically parallel to one another in a vertical plane parallel to said second screw shaft at one side of the second carriage toward the first conveyor, a third carriage mounted on said slide guides for movement with the second carriage and for linear vertical sliding movement relative to said second carriage between a lowered position and a raised position relative to the second carriage, means for effecting linear vertical reciprocation of said third carriage up and down relative to said second carriage between said lowered and said raised positions comprising a third screw shaft mounted on said second carriage extending vertically between said slide guides at said one side of the second carriage in a vertical plane at right angles to said second screw shaft, a third nut fixed to said third carriage, said third screw shaft extending vertically through the nut in threaded interengagement therewith, and a third electric motor carried by said second carriage for driving said third screw shaft, pusher means carried by said third carriage for pushing a group of articles off the first conveyor on to the second conveyor, said pusher means being located at such an elevation relative to the first conveyor when the third carriage is in its said lowered position for engagement with said group of articles on the first conveyor on movement of the third carriage with the second and third carriages from the retracted position of the first carriage to its advanced position, and at such an elevation when the third carriage is in its said raised position as to clear the tops of articles on the first conveyor, and a programmable controller for controlling said first, second and third electric motors for operation in cycles each starting with the first carriage in its retracted position, the second carriage in its rearward position and the third carriage down in lowered position and comprising sliding the first carriage inwardly from its retracted to its advanced position and sliding the second carriage forward to its forward position and concomitantly moving the pusher means forward for pushing a group of articles off the first conveyor and onto the second conveyor, then raising the third carriage to its raised position for clearing articles advancing on the first conveyor, moving the second carriage back to its rearward position, moving the first carriage back to its retracted position to retract the pusher means, and then moving the third carriage back down to its lowered position.

2. Apparatus as set forth in claim 1 wherein the pusher means comprises an elongate bar having pockets for receiving articles to be transferred, and wherein means is provided mounting the bar in position extending generally horizontally parallel to said first axis with the bar vertically adjustable for positioning it at the level of the articles on the first conveyor and also with the bar removable to enable replacement of one bar with another.

3. Apparatus as set forth in claim 2 wherein said programmable controller is programmable to operate said second electric motor to drive the second screw shaft to accelerate the second carriage in its forward movement immediately after the pusher means has contacted said group of articles to begin transfer of the group from the first conveyor on to the second conveyor, the acceleration serving to effect a separation of the group of articles being transferred from the incoming articles advancing on the first conveyor.

4. Apparatus as set forth in claim 3 wherein said programmable controller is programmable to operate said second electric motor to drive the second screw shaft in such manner as to vary the stroke of the second carriage between its rearward and forward positions on alternate cycles of operation of the apparatus to stagger the articles in one row of articles transferred on to the second conveyor relative to the articles in the row previously transferred on to the conveyor.

* * * * *

UNITED STATES PATENT AND TRADEMARK OFFICE
CERTIFICATE OF CORRECTION

PATENT NO. : 5,044,488
DATED : September 3, 1991
INVENTOR(S) : James A. Bolin

It is certified that error appears in the above-identified patent and that said Letters Patent is hereby corrected as shown below:

Column 8, claim 1, line 57, "tranducer" should read ---transfer---.

Column 9, claim 1, line 19, "fourth" should read ---forth---.

Signed and Sealed this

Fifteenth Day of February, 1994

Attest:

BRUCE LEHMAN

Attesting Officer          Commissioner of Patents and Trademarks